Jan. 21, 1930.   C. L. DAWSON   1,744,449
COLOR MIXER
Filed July 19, 1929
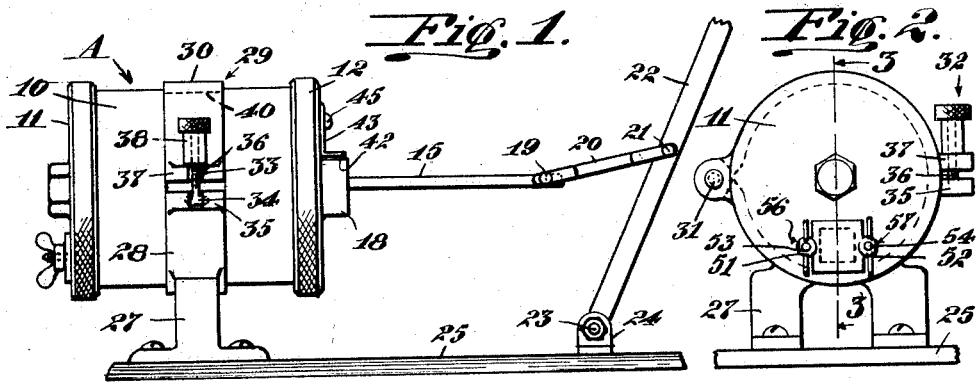
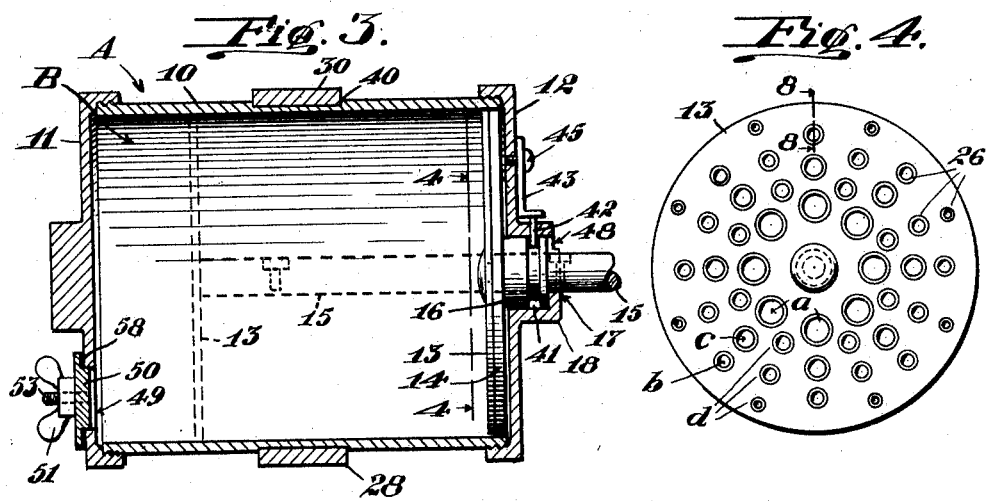
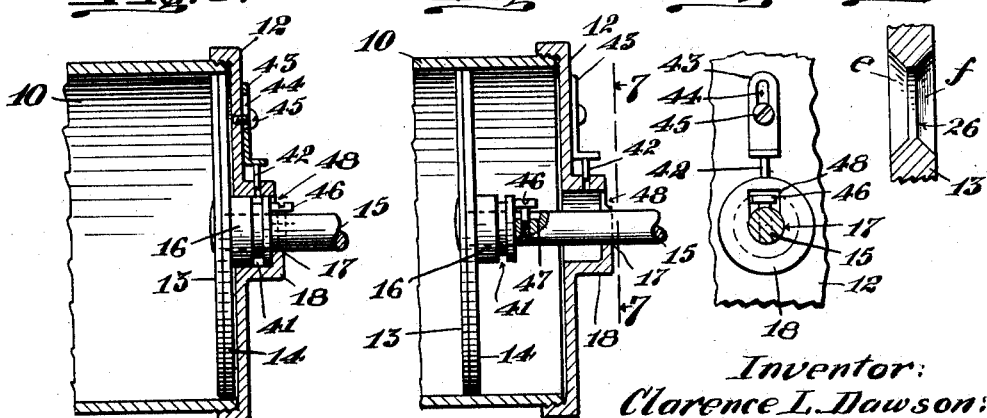
Inventor:
Clarence L. Dawson
By R. S. Berry
Atty.

Patented Jan. 21, 1930

1,744,449

UNITED STATES PATENT OFFICE

CLARENCE L. DAWSON, OF LOS ANGELES, CALIFORNIA

COLOR MIXER

Application filed July 19, 1929. Serial No. 379,417.

This invention relates to a mixing machine and has as its primary object the provision of a device which is especially applicable for use in coloring pasty and unctuous substances such as butter, oleomargarine and other soft plastic and lardaceous material.

Another object is to provide a device of the above character which is manually operable and which is adapted to be employed as a household utensil for the purpose of coloring or mixing pasty food products.

Another object is to provide a mixer which is rapid and thorough in its operation in effecting mixing action, from which mixed materials may be easily and quickly ejected, and which is so constructed that the parts may be readily separated to facilitate cleansing thereof.

With the foregoing objects in view, together with such other objects and advantages as may subsequently appear, the invention resides in the parts and in the combination, construction and arrangement of parts hereinafter described and claimed and illustrated by way of example in the accompanying drawings, in which:

Fig. 1 is a view of the mixer as seen in side elevation;

Fig. 2 is a front end view thereof;

Fig. 3 is a detail in vertical section as seen on the line 3—3 of Fig. 2;

Fig. 4 is a detail in elevation as seen on the line 4—4 of Fig. 3 showing the mixing element;

Fig. 5 is a detail in section of the rear portion of the mixer showing the parts as positioned in readiness for effecting operation of an ejector;

Fig. 6 is a similar view showing the ejector in a partially advanced position;

Fig. 7 is a detail in section and elevation as seen on the line 7—7 of Fig. 6;

Fig. 8 is an enlarged detail in section taken on the line 8—8 of Fig. 4, illustrating the formation of an opening in the mixing element.

Referring to the drawings more specifically, A indicates generally the mixer housing which embodies a tubular cylinder 10 closed at its ends by front and rear end walls 11 and 12; the end walls being here shown as affixed to the cylinder 10 by screw-threaded engagement therewith, whereby the end walls may be readily removed and replaced. The cylinder 10 may be formed of glass where it is desired to observe the operations interiorly thereof. The cylinder 10, with its end walls, enclose a mixing chamber B, and arranged in this chamber is a pair of disks 13 and 14 which extend transversely of the cylinder with their outer margins extending close to the inner periphery of the cylinder 10. The disk 13 is rigidly mounted on the end of a rod 15 which slidably extends through a hub 16 on the disk 14 and is slidably supported in a guide opening 17 formed in a boss or hub 18 on the end plate 12. The outer end of the rod 15 is pivotally connected at 19 to a link 20 which in turn is pivotally connected at 21 to a manually operable lever 22 fulcrumed at its lower end on a pivot pin 23 carried by a standard 24 affixed to a base 25.

The disk 13 is apertured, being formed with a series of openings 26 which openings are preferably formed and arranged to provide several series of openings of different dimensions. The openings are here shown as disposed in radiating rows with relatively large openings $a$ contiguous the central portion of the disk and with relatively smaller openings $b$ adjacent the outer margin of the disk and with intermediate sized openings $c$ arranged between the openings $a$ and $b$; other small openings $d$ extending between adjacent radiating rows of the openings $a$, $b$ and $c$ on the outer portion of the disk. Obviously any other arrangement of the openings may be employed but I have found in practice that it is desirable that the disk be formed with a number of relatively large openings near its central portion with relatively smaller openings in its outer portion as such arrangement acts to facilitate intermixing of materials in the mixer; the disk 13 being designed to be reciprocated in the cylinder 10 so as to cause the materials within the cylinder to pass back and forth through the openings 26 on reciprocation of the disk. The opposite side margins of the openings 26 are bevelled as indicated at $e$ and $f$ in Fig. 8 so that the sides of the openings converge from opposite sides of the disk, thereby affording a funnel-like arrangement which serves, on advancing the disk against plastic materials in the cylinder, to quicken and facilitate the mixing action by setting up a disturbance or agitation of the stream of materials being forced through the openings.

The cylinder 10 is demountably supported on the base 25 being here shown as seating on a standard 27 formed with an arcuate saddle portion 28; the cylinder being rigidly held in place on the standard by a clamp 29 here shown as embodying an arcuate leaf 30 hinged at 31 to one end of the saddle 28 and detachably secured to the other end of the saddle by a fastener 32 embodying a threaded stem 33 pivotally connected at 34 to a flange 35 on the end of the saddle opposite the hinge 31. The threaded stem 33 is adapted to be swung to extend into an open ended slot 36 on a flange 37 formed on the outer end of the leaf 30; a tightening nut 38 being screwed on the stem 33 adapted to bear against the flange 37 to draw the leaf 30 into clamping engagement of the cylinder 10. As a means for rigidly holding the cylinder against longitudinal movement in its mounting, the cylinder is formed with an annular external channel 40 to receive the saddle 28 and the leaf 30.

The disk 14 is imperforated and is designed to be normally disposed contiguous the inner face of the wall 12 as shown in Fig. 3, and as a means for holding the disk 14 in this position the hub 16 of the disk is formed with an annular channel 41, and a pin 42 is projected through an opening in the hub 18 on the end plate 12 to extend into the channel 41 and thereby hold the hub 16 against longitudinal movement within the hub 18. As a means for facilitating moving the pin 42 in and out of engagement with the channel 41 the pin is here shown as carried on a slide plate 43 formed with an elongated slot 44 through which is passed a screw 45 threaded into engagement with the end plate 12; the screw 45 being adapted to be tightened to hold the slide 43 in either an advanced or retracted position.

As a means for effecting interengagement between the disk 14 and the rod 15 so that the disk 14 which constitutes an ejector may be advanced and retracted within the cylinder 10 by reciprocation of the rod 15, a screw 46 is mounted on the rod 15 and is normally disposed with the head thereof countersunk into a recess 47 in the rod so that it may pass through the hub 16 of the ejector disk when the latter is held against movement by the pin 42. The screw 46 may be unscrewed so that the head thereof will project beyond the outer periphery of the rod 15 as shown in Figs. 5 and 6 whereupon on withdrawing the pin 42 from engagement with the channel 41 the disk 14 will be caused to advance on forward movement of the rod 15. The ejector disk 14 will then be engaged between the mixing disk 13 and the screw 46, so that it may be moved back and forth in the cylinder 10 on reciprocation of the rod 15.

The boss or hub 18 is formed with a slot 48 leading from the margin of the opening 17, shown in Fig. 7 to permit the projected head of the screw to pass through the end plate 12; the margin of the opening 17 extending around the rod a distance greater than one half its circumference so as to afford a guide bearing for the latter and thereby prevent tilting of the disk in the cylinder when in an advanced position.

As a means for permitting discharge of materials from the mixer, the forward end plate 11 is provided with an outlet opening 49 adjacent the margin thereof which opening is here shown as rectangular. A cover 50 is provided for closing the opening 49 during the mixing operation, which cover is here shown as demountably held in its closing position by means of a pair of wing nuts 51 and 52 screwed on threaded stems 53 and 54 projecting from the end plate 11; the wing nuts each having a flattened peripheral portion as indicated at 56 and 57 whereby on turning the wing nuts with the flattened portions presented towards each other the cover 50 may be withdrawn; the stems 53 and 54 and the wing nuts thereon being so arranged that when the wing nuts are disposed with their flattened faces extending away from each other portions of the nuts will extend over the margins of the cover 50 and bear thereon so that the margin of the latter will bear against the end plate 11. A gasket 58 may be interposed between the margin of the cover and the end plate 11 so as to afford a tight joint when the cover is clamped against the end plate.

In the operation of the invention the end wall 11 is removed and the materials to be colored, together with a suitable coloring matter, is placed in the mixing chamber B, whereupon the end wall 11 is replaced. The mixing disk is then advanced against the mass in the mixing chamber by operation of the hand lever 22 in such manner that the materials in the mixing chamber are caused to be squeezed through the openings 26 in the disk and thereby pass to the opposite side of the latter. On the mixing disk being moved to its forwardmost position it is retracted against the mass and the materials are again forced back through the openings 26 to the front side of the disk. In this manner reciprocation of the disk causes the materials to be squeezed back and forth through the openings which results on a few reciprocations of the disk in a thorough intermixing of the materials and the coloring matter.

When it is desired to eject the mixed materials from the mixer the perforated disk is disposed in its rearwardmost position in front of the imperforated ejector disk 14, the pin 42 is withdrawn from the channel 41 and the screw 46 is elevated as shown in Fig. 5, whereupon the rod 15 is advanced so as to cause the disks 13 and 14 to move forward collectively against the mass in the mixing chamber. In this manner the materials may, if desired, be initially compressed so as to squeeze out excess liquids which will pass to the space rearward of the ejector disk around the margin thereof; sufficient clearance being provided for this purpose. To effect discharge of the materials from the mixing chamber, the cover 50 is removed and the ejector is advanced against the materials thereby forcing the materials through the opening 49 to discharge.

When it is desired to clean the mixer the cylinder is removed from the standard by releasing the hinge leaf 30 and swinging the latter clear of the cylinder so that the latter may be lifted from the saddle 28. The end walls of the cylinder are then removed which exposes the interior surfaces of the device so that they may be readily cleansed.

While I have shown and described the specific embodiment of the invention I do not limit myself to the exact details of construction and arrangement shown but may employ such changes and modifications as come within the spirit of the invention and as specified in the accompanying claims.

I claim:

1. In a mixer, a cylinder closed at its ends, a mixing disk within said cylinder extending transversely thereof formed with a series of openings, means for reciprocating said disk whereby materials in said cylinder may be caused to alternately move from one side to the other of said disk through said openings, an ejector disk in said cylinder, and means for connecting said ejector disk to said last-named means and disconnecting it therefrom operable exteriorly of said cylinder.

2. In a mixer, a cylinder closed at its ends, a mixing disk within said cylinder extending transversely thereof formed with a series of openings, means for reciprocating said disk whereby materials in said cylinder may be caused to alternately move from one side to the other of said disk through said openings, an ejector disk in said cylinder, means for holding said ejector disk fixed against one end of the cylinder operable to release the ejector disk, and means whereby said disk may be caused to move in unison with the mixing disk.

3. In a mixer, a tubular cylinder, an end wall at each end of the cylinder, a reciprocal rod extending through one of the end walls, an apertured mixing disk fixed on said rod adapted to be advanced and retracted on reciprocation of said rod, an ejector disk in said cylinder rearward of said mixing disk through which said rod slidably extends, means for holding said ejector disk in fixed relation to the cylinder operable to release the disk, means for effecting interconnection between the disk and the rod whereby on reciprocation of the rod and mixing disk the ejector disk will move therewith.

4. In a mixer, a tubular cylinder, an end wall at each end of the cylinder, a reciprocal rod extending through one of the end walls, an apertured mixing disk fixed on said rod adapted to be advanced and retracted on reciprocation of said rod, an ejector disk in said cylinder rearward of said mixing disk through which said rod slidably extends, means for holding said ejector disk in fixed relation to the cylinder operable to release the disk, means for effecting interconnection between the ejector disk and the rod whereby on reciprocation of the rod and mixing disk the ejector disk will move therewith, said means including a screw threaded in said rod adapted to be either countersunk in the latter or projected therefrom, and arranged so that when projected from the rod it will act on advance of the rod to effect advance of the ejector disk.

5. In a mixer, a tubular cylinder, an end wall on each end of said cylinder, a hollow hub on one of the end walls, an ejector disk within the cylinder, a hub on said disk adapted to extend into the hub on the end wall, said hub being formed with a annular channel, a pin, means whereby said pin may be positioned in engagement with said channel through the hub on the end plate, said pin being adapted to be disposed out of engagement with said channel, a reciprocable rod slidably extending through said hubs, an apertured mixing disk in said cylinder extending in front of said ejector disk, and means on said rod operable to engage said hub on said ejector disk whereby said ejector disk, mixing disk and rod may be advanced and retracted in unison.

6. In a mixer, a tubular cylinder, end walls on said cylinder, one of said end walls being formed with a discharge outlet, means for closing said outlet, a reciprocable rod extending through the other end wall, an apertured disk in said cylinder affixed to said rod, an ejector disk in said cylinder rearward of said perforated disk, means for holding the ejector disk against movement operable to release the disk and means whereby said disks may be caused to move in unison with said rod on advance of the latter to eject the contents of the cylinder through said discharge opening.

CLARENCE L. DAWSON.